United States Patent [19]

Bogaerts et al.

[11] Patent Number: 4,510,828

[45] Date of Patent: Apr. 16, 1985

[54] LATHE CROSS FEED ASSEMBLY

[75] Inventors: Leo C. Bogaerts, Antioch; John W. Murphy, Waukegan, both of Ill.

[73] Assignee: Ammco Tools, Inc., North Chicago, Ill.

[21] Appl. No.: 592,899

[22] Filed: Mar. 23, 1984

[51] Int. Cl.³ .......................... B23B 3/22; B23B 5/04; B23B 7/00; B23B 21/00

[52] U.S. Cl. ...................................... 82/4 A; 82/2 A; 82/25

[58] Field of Search ................. 82/4 A, 2 A, 4 R, 25; 29/54, 55, 52, 53

[56] References Cited

U.S. PATENT DOCUMENTS

| Re. 13,584 | 6/1913 | Norman | 82/37 |
|---|---|---|---|
| 3,038,356 | 6/1962 | Atzberger | 82/4 A |
| 3,387,516 | 6/1968 | Martin | 82/25 |
| 3,626,793 | 12/1971 | Rice | 82/4 A |
| 3,893,356 | 7/1975 | Atzberger | 82/4 A |

Primary Examiner—Lowell A. Larson
Assistant Examiner—William E. Terrell
Attorney, Agent, or Firm—Edmond T. Patnaude

[57] ABSTRACT

A lathe having a cross feed assembly including a universal tool post for simultaneously mounting a boring bar and two face cutters is disclosed. The universal tool post provides for changing cutting tools for different work pieces without detaching unused tools from the tool post. A combination of T-slots, tool holders and clamps provide for positioning the unused tool out of the work area and the desired tool at the work area.

12 Claims, 7 Drawing Figures

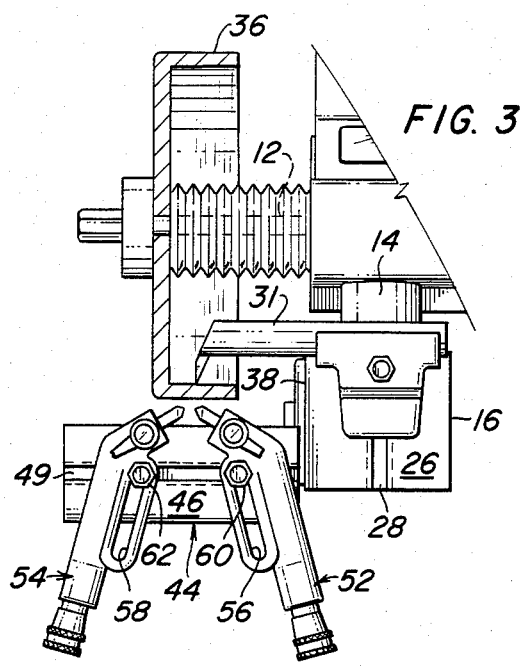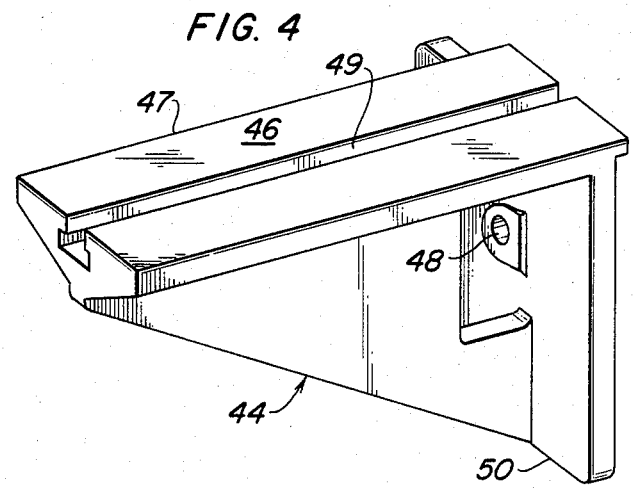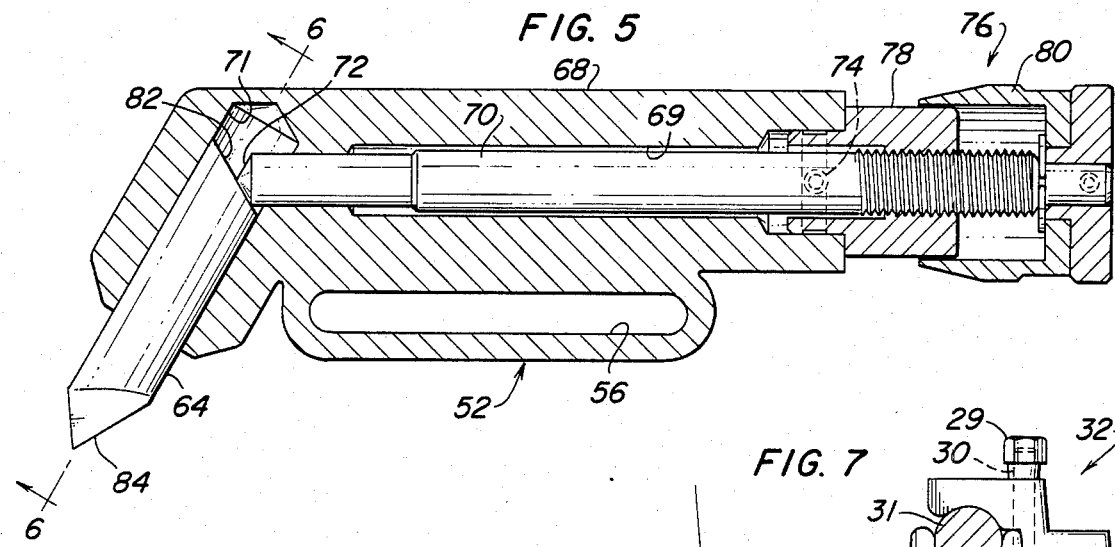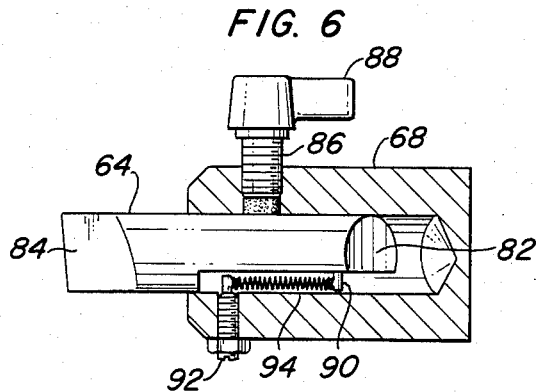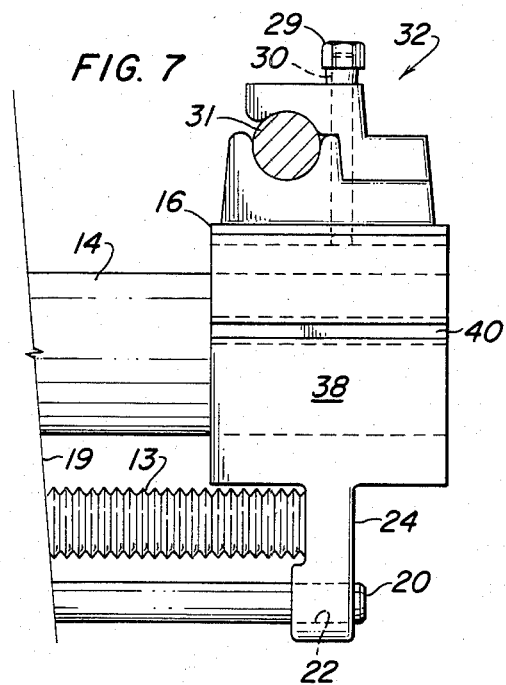

LATHE CROSS FEED ASSEMBLY

BACKGROUND OF THE INVENTION

This invention relates to the field of lathes and more particularly the invention relates to a lathe for resurfacing brake drums and rotors.

It is common practice when servicing the brakes on vehicles to resurface, in the case of disc brakes, both sides of the rotor to maintain parallelism between the surfaces, and, in the case of drum brakes, to turn the inner surface of the drum so as to maintain a brake surface concentric with the drum rotational axis. These resurfacing operations are normally performed on lathes specially adapted to mount the rotor or drum to be resurfaced. From a service, and principally in regard to efficiency and profitability standpoint, it is highly desirable to have a lathe that can resurface either rotors or drums. And, it is highly desirable that such a lathe requires minimum manipulation of tools or modifications when changing between work pieces. In addition to resurfacing brake parts, other parts such as engine flywheels frequently require resurfacing for proper clutch operation. Therefore, it would be highly desirable to have a lathe also capable of resurfacing flywheels as well as rotors and drums. Providing for such a lathe eliminates separate machines for each type of work piece.

Heretofore, a single lathe has been able to service rotors, drums and flywheels, but has required time consuming steps of removing and replacing the various boring bars and cross feed tool holders and cutters for use with the particular work piece. Additionally, these multipurpose prior art machines have been limited in the maximum thickness of the rotor or flywheel that can be accommodated.

SUMMARY OF THE INVENTION

The present invention overcomes the shortcomings of the prior art by providing for a lathe having a cross feed block assembly adapted to provide simultaneous mounting of individually adjustable facing tool cutter assembly holders and an adjustable drum boring bar. The preferred embodiment of the cross feed block includes horizontal and vertical planar surfaces each having a T-slot perpendicular to the lathe arbor longitudinal axis. The boring bar mounts on the horizontal surface and is rotationally and linearly adjustable thereon. The preferred embodiment also includes a facing tool post also having a horizontal planar surface and T-slot parallel to the lathe arbor longitudinal axis. The facing tool post is linearly adjustable along the cross feed block vertical surface T-slot. In another embodiment, individual facing tool cutter assembly holders are independently rotationally and linearly adjustable along the facing tool post horizontal surface. The combination of cross feed block surfaces, facing tool post surface and T-slots provide for appropriate positioning of the respective tools for carrying out the desired cutting operation without detaching and removing the unused tools from the lathe. The cross feed block mounting arrangement provides for a multi-purpose lathe having fast changeover of tools for efficient operation.

BRIEF DESCRIPTION OF THE DRAWINGS

The present invention will be better understood by a reading of the following detailed description taken in connection with the accompanying drawings wherein:

FIG. 3 is a top view of the preferred embodiment of the lathe showing the facing tools positioned removed from the work station and the boring bar in position to cut the surface of a brake drum.

FIG. 4 is a perspective view of the preferred embodiment of the facing tool post showing details of construction.

FIG. 5 is a horizontal longitudinal cross-sectional view of one facing tool cutter assembly holder.

FIG. 6 is a cross-sectional view along 6—6 of FIG. 5.

FIG. 7 is a side view in partial cross-section showing the boring bar holder configuration and attachment to the cross feed block.

DETAILED DESCRIPTION OF THE PREFERRED EMBODIMENT

Figure 1:
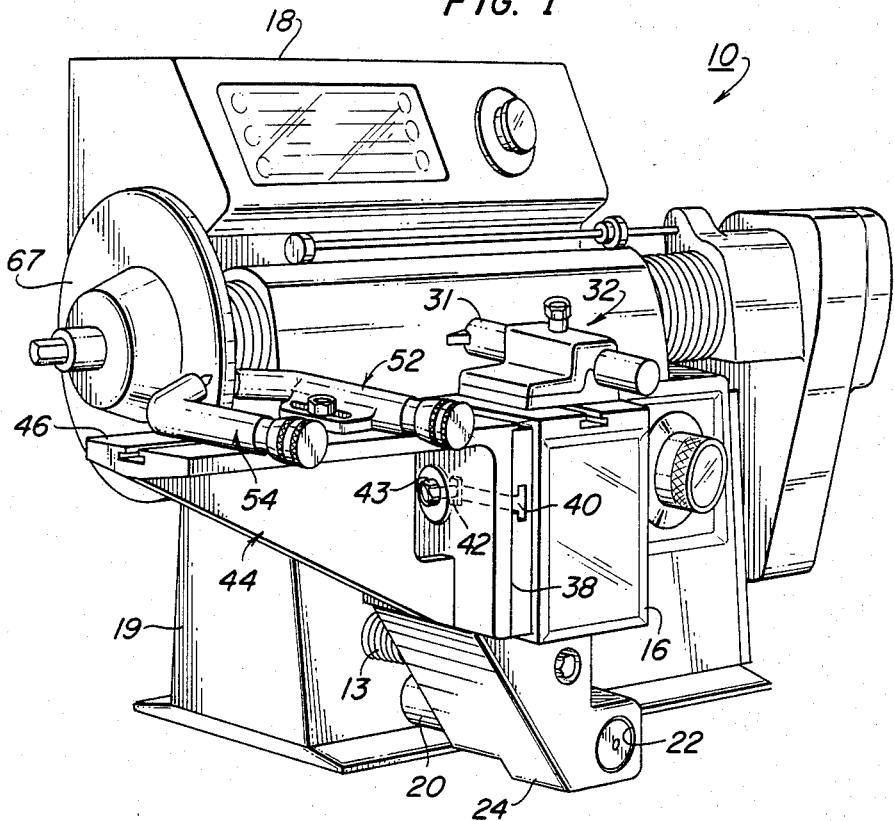
FIG. 1 is a perspective view of a preferred embodiment of the lathe showing the cross feed mounting of the boring bar and facing tool cutter assembly holders.

Shown in FIG. 1 is a lathe 10 including a motor and appropriate mechanical components, not shown in the drawings, for extending and retracting an arbor 12 along the longitudinal axis of the lathe and for causing the arbor to rotate. The mechanical components for causing the arbor to extend, retract and rotate are well known in the art and are not the subject of the present invention. Only those components necessary for an understanding of the invention and its operation are shown in detail in the figures. Lathe 10 includes a cross feed shaft 14 over which a cross feed member 16 is caused to move perpendicularly to arbor 12. Typically, cross feed member 16 is moved by a lead screw 13, see FIG. 7, and the other heretofore mentioned mechanical components. Cross feed shaft 14 and block member 16 are rigid, massive members providing for vibration free operation. Normally, the movement of cross feed member 16 is controlled by a micrometer dial, not shown, or, as in the case of the present invention, its movement is electronically controlled by an electronic control unit 18 which is connected to the mechanical components and drive motor for moving the cross feed member. Control unit 18 also controls the rotation and movement of arbor 12. Extending from lathe frame 19 is cross feed guide bar 20 which is received in a guide hole 22 located in an extension 24 on cross feed member 16. Guide bar 20 maintains rigidity of the cross feed member over its movement. In the embodiment shown in FIGS. 2 and 3, cross feed member 16 includes a horizontal planar surface 26 having a T-slot 28 positioned perpendicularly to the arbor longitudinal axis and parallel to the direction of movement of the cross feed member. As shown in FIG. 7, a boring bar clamp 32 is mounted to horizontal planar surface 26 by a T-bolt 30 received in slot 28 and a fastener 29. The T-slot, bolt and fastener mounting arrangement allows adjustment of a boring bar 31 so as to be positioned removed from the work station area, as shown in FIG. 2, or orientated to cut a drum 36, as shown in FIG. 3.

Figure 2:
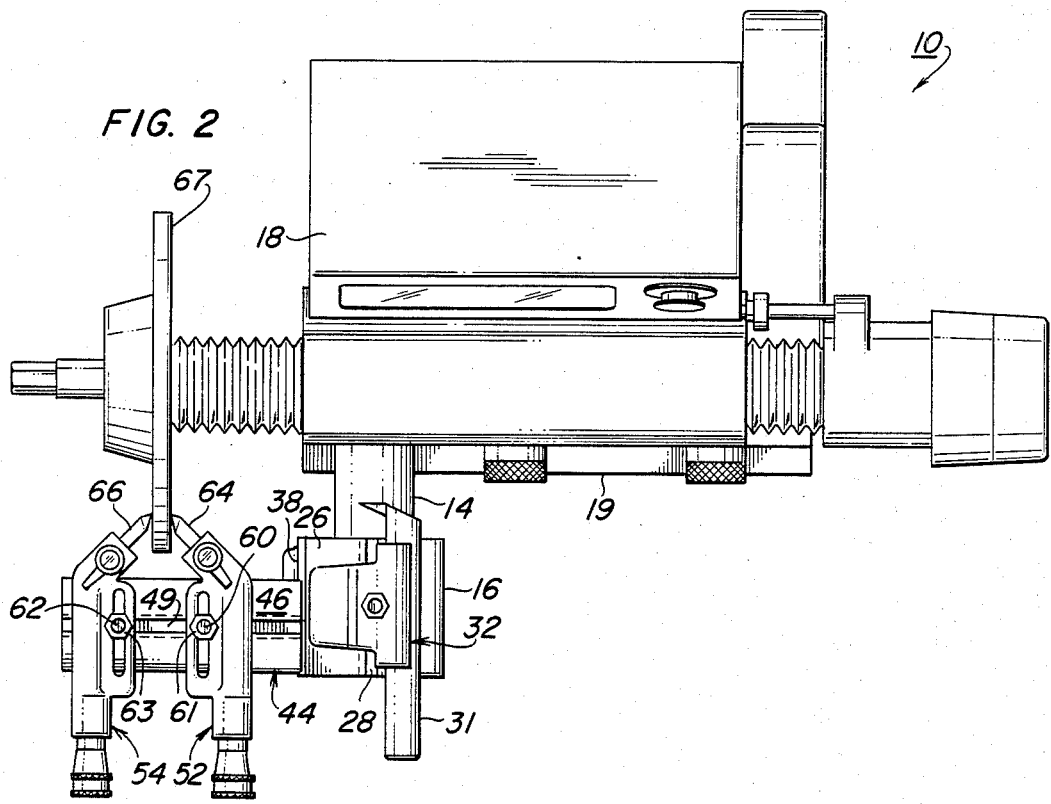
FIG. 2 is a top view of the lathe of the preferred embodiment showing the boring bar positioned removed from the work station and the facing tools in position to cut a rotor.

Cross feed member 16 also includes a vertical planar surface 38, as shown in FIGS. 1, 2 and 3, which also has a T-slot 40 located perpendicularly to the arbor longitudinal axis and parallel to the direction of travel of the cross feed member. Mounted to vertical planar surface 38 by another T-bolt 42 and fastener 43 is a facing tool post 44. Referring to FIG. 4, facing tool post 44 includes a horizontal planar surface 46 on one flange 47 and has a third T-slot 49 orientated parallel to the arbor longitudinal axis. A hole 48 is provided in a vertical leg 50 of the tool post through which T-bolt 42 passes to be received in T-slot 40 for mounting the facing tool post to the cross feed member vertical planar surface.

Two facing cutter tool holders 52, 54 having elongated apertures 56, 58, see FIG. 5, are secured to the horizontal surface of the tool post by T-bolts 60, 62 and respective fasteners 61, 63. T-bolts 60, 62 pass through the elongated apertures in the tool holder and engage T-slot 42. As shown in FIG. 5, and described below, tool holders 52, 54 hold and allow adjustment of cutters 64, 66.

It can be seen that cutters 64, 66 and their respective holders 52, 54 can be positioned away from the work station area without being detached from the lathe, thereby allowing positioning of the boring bar at the work station for cutting a drum, see FIG. 3. Alternatively, the cutters can be positioned at the work station, as in FIG. 2, to simultaneously face both sides of a rotor 67, with the boring bar positioned away from the area, also without being detached from the lathe. Holders 52, 54 can be individually adjusted linearly on surface 46 along the T-slot in the tool post 44 to accommodate both narrow and wide work pieces. Holders 52, 54 can also be adjusted perpendicularly to the arbor by sliding the holders along apertures 56, 58. Additionally, the holders can also be pivoted around their respective attachment T-bolts 60, 62 to provide an adjustment angle of approach of the cutting tool with respect to the work piece. As mentioned hereinabove, this structure providing for multiple mounting and adjustment of the various cutters and holders allows for positioning of the cutting tools away from the work area without detaching the tool or holder from the lathe while another cutter is being used. When facing only one side of a work piece, as in case of a flywheel, the unused cutter can be positioned away from the area to accommodate a very wide work piece.

As shown in FIGS. 2 and 3, tool holders 52, 54 are identical except for the angle at which the cutter in each holder is oriented with respect to the work piece. Each holder 52, 54 includes one holder which orients the cutter at a predetermined angle from the longitudinal axis of the holder and another which orients a cutter at an equal angle to the opposite side of the longitudinal axis. Each holder includes a body 68, preferably cast iron, which includes the heretofore mentioned elongated aperture 56. Body 68 also includes a first bore 69 into which a shaft 70 is mounted. Shaft 70 includes a conical end 72 and has its opposite end 74 connected to a micrometer assembly 76. Micrometer 76 includes a calibrated scale 78 and a rotating dial 80 which is connected to shaft 70.

Body 68 is angled on the end opposite the micrometer assembly an amount appropriate for positioning the cutter with respect to the work piece and includes a second bore 71 in communication with the first bore into which the cutter is inserted. The cutter is tapered on its end 82 opposite its cutting end 84 and abuts the conical surface of shaft 70.

Referring to FIG. 6, the body member 68 is provided with a frictional set screw 86 which includes a handle or lever arm 88 for turning the screw and retaining or releasing the cutting tool within the second bore. As also shown in FIG. 6, the cutter includes an undercut area 90 forming a cavity between the cutter and body 68. The body is also provided with a removable screw 92 which extends into the cavity at one end thereof, and the cutter is provided with a pin 90 at the opposite end of the cavity. A spring 94 is compressed between pin 90 and screw 92 and biases the cutter against the conical surface of shaft 70. It can be seen that as the micrometer dial is rotated, the shaft is moved for and aft within the first bore, and the cutter correspondingly moves toward or away from the workpiece an amount proportional to the dial movement.

PREFERRED MODE OF OPERATION

In operation, if a brake drum is to be turned, the face cutters are positioned out of the work area by loosening tool post T-bolt fastener 43 and sliding the tool post away from the work area. In most cases, sliding the tool post to its extreme removed position will provide sufficient clearance. If more clearance is needed, the tool holders can be positioned at their extreme removed positions by loosening their respective attachment T-bolt fasteners and sliding the holder to the limit of the elongated apertures. Alternatively, or additionally, the tool holders can be rotated out of the way and slid to the extreme position along the T-slot in the tool post horizontal surface. After positioning the face cutters out of the work area, the boring bar is positioned to cut the drum by loosening the boring bar T-bolt fastener and manipulating the bar and clamp as needed.

When it is desired to bein facing rotors or flywheels, the boring bar clamp is loosened and the boring bar is repositioned out of the work area. The respective facing tool holders are individually adjusted to the work piece being surfaced.

It can be appreciated that the mounting structure provides easy, fast, efficient changeover of cutting tools between different work piece types.

Having described the preferred embodiment of the invention, those skilled in the art can readily devise other embodiments and modifications having the benefit of the above detailed description and drawings. Therefore, said other embodiments and modifications are to be considered to be within the scope of the appended claims.

What is claimed is:

1. A cross feed assembly for use with a lathe having an arbor and drive means for rotating the arbor, comprising in combination
   a boring bar assembly,
   first and second facing tool cutter assemblies,
   said cross feed member having a first planar surface parallel with the longitudinal axis of said arbor and a second planar surface perpendicular to said first planar surface,
   first mounting means for mounting said boring bar assembly to said cross feed member to permit rotational linear adjustment of said boring bar assembly within a plane parallel with the longitudinal axis of said arbor for positioning said boring bar assembly relative to a work piece mounted on said arbor, second mounting means for mounting said first and second facing tool cutter assemblies to said cross feed member to permit simultaneous rotational and linear adjustment of said facing tool cutter assemblies within a plane parallel to the axis of rotation of said arbor for positioning said cutter assemblies relative to a work piece mounted on said arbor, said first mounting means including a slot in said first planar surface extending across said first planar surface in a direction perpendicular to the longitudinal axis of said arbor, a first elongated, adjustable attachment member, said slot having a configuration adapted to receive and retain said attachment member, a clamp member adapted to engage said boring bar assembly and having a planar surface resting on said first planar surface, and also having a hole therethrough aligned with said slot in said first planar surface through which said attachment member passes to engage said slot, whereby said clamp member and said boring bar assembly are rotationally and linearly positionable on said first planar surface throughout the length of said slot, said first and second mounting means including means for adjustably positioning said boring bar assembly and said facing tool cutter assemblies relative to one another for allowing selective use of said assemblies while all of said assemblies are mounted to said lathe, said second mounting means including a slot in said second planar surface extending across said second planar surface in a direction perpendicular to the longitudinal axis of said arbor, a second elongated adjustable attachment member, said slot in said second planar surface having a configuration adapted to receive and retain said second elongated attachment member, a tool secured to said second planar surface by said second elongated adjustable attachment member and being adjustably positionable on said second planar surface throughout the length of said slot in said second planar surface, said tool including a third planar surface parallel to the longitudinal axis of said arbor and having a slot therein extending across said third planar surface in a direction parallel to the longitudinal axis of said arbor, a third elongated adjustable attachment member, said slot in said third planar surface having a configuration adapted to receive and retain said third attachment member, and at least one tool holder for holding one of said facing tool cutter assemblies, said at least one tool holder being mounted on said third planar surface by said third attachment member, whereby said tool holder is rotationally and linearly positionable on said third planar surface throughout the length of said slot in said third planar surface.

2. The cross feed assembly as defined in claim 1 wherein said slot in said first planar surface is a T-slot; and said first elongated adjustable attachment member is a T-bolt threaded on one end to receive a threaded fastener.

3. A cross feed assembly as defined in claim 2 wherein said slot in said second planar surface and said slot in said third planar surface are T-slots, and said second and third elongated adjustable attachment members are T-bolts respectively threaded on one end to receive a threaded fastener.

4. The cross feed assembly as defined in claim 1 wherein said holder includes an elongated aperture through which the third elongated attachment member passes providing for additional linear positioning of said holder on the tool post third planar surface over the length of said elongated aperture.

5. A cross feed assembly as set forth in claim 1, comprising a second tool holder for holding the other of said facing tool cutter assemblies, said second tool holder being mounted on said third planar surface, whereby said facing tool cutter assemblies may be positioned to cut simultaneously two opposing parallel surfaces on a work piece mounted on said arbor.

6. A cross feed assembly as defined in claim 5 wherein said facing tool cutter assembly holder comprises:

a body member having a first bore, said body member having:

a second bore intersecting said first bore at one end thereof at an angle from the longitudinal axis of the first bore, one of said facing tool cutter assemblies being received in said second bore, a shaft disposed within said first bore and having a conical end abutting said tool cutter assembly;

a micrometer assembly attached to said body member and to said shaft opposite said conical end, said micrometer assembly being adapted to rotate and extend and retract said shaft within said first bore an amount proportional to the rotation of said micrometer, and means for biasing said facing tool cutter assembly into abutment with said conical end of said shaft whereby said one of said facing tool cutter assemblies is extended and retracted from said second bore an amount proportional to the rotation of said micrometer.

7. The cross feed assembly as defined in claim 6 further comprising:

a second facing tool cutter assembly holder mounted on said third planar surface and a second bore therein intersecting said first bore at an angle to the longitudinal axis of the first bore, and said second facing tool cutter assembly being positioned on said third planar surface adjacent the work piece for simultaneously cutting a surface parallel to the surface cut by the first assembly.

8. A cross feed assembly for use in a lathe of the type having a cross feed, an arbor and an arbor drive for surfacing a work piece comprising:

a cross feed member operatively connected to said drive means and having first and second planar surfaces at right angles to each other, each said surface including a T-slot oriented perpendicular to the longitudinal axis of said arbor;

clamp means for securing a boring bar assembly to said first planar surface, said clamp means including a first T-bolt received at one end in said T-slot and having a threaded end for receiving an adjustable fastener, said clamp means providing for rotational and linear adjustment of said boring bar assembly on said first planar surface along said slot, and, a tool post for receiving therein two individual facing tool cutter assembly holders mounted to said second planar surface, a second T-bolt extending through said tool post and received at one end in said T-slot in said second planar surface, said second T-bolt including a threaded end for receiving a second adjustable fastener providing for linear positioning of the tool post on the second planar surface along the T-bolt in said second planar surface, said tool post further including a third planar surface havng a third T-slot therein extending parallel to the longitudinal axis of said arbor, said third T-slot providing for mounting said individual facing tool holders to said third planar surface by T-bolts extending through said holders and received at one end in said T-slot in said third planar surface, said T-bolts being threaded on one end to receive an adjustable fastener providing for individual rotation and linear positioning of said tool holders on said third planar surface along the T-slot therein.

9. A cross feed assembly as defined in claim 8 wherein said tool post comprises:

a body member including a first leg portion having a planar mounting surface for engaging the cross feed member second planar surface and having an opening in said first leg portion aligned with the second planar surface T-slot through which the second T-bolt passes, said body member further including a second leg portion having the tool post third planar surface and T-slot located therein at right angles to said first planar mounting surface.

10. A cross feed assembly as defined in claim 9 wherein said body member further comprises:

means connecting said first and second leg portions together for strengthening said member.

11. A cross feed assembly as defined in claim 8 wherein three are two individual facing tool holders mounted to the tool post third planar surface, each tool holder being adapted to hold cutting tools for simultaneously surfacing opposing parallel surfaces on the work piece.

12. A cross feed assembly as defined in claim 11 wherein said tool holders each comprises:

a body member having a first bore and a second bore intersecting said first bore at a predetermined angle from the longitudinal axis of said first bore and further having an elongated aperture parallel with said first bore through which said mounting T-bolt passes;

a rotatable shaft in said first bore having a conical shaped end at the point of intersection of said bores;

a micrometer scale attached to said body member concentric with said shaft;

a rotatable micrometer dial attached to said shaft end opposite said conical end and operatively associated with said micrometer scale and shaft to reflect incremental linear travel of said shaft;

a cutting tool in said second bore in contact with the conical surface of said shaft; and means for biasing said cutting tool into contact with said conical surface.

* * * * *